United States Patent [19]

Gerlach et al.

[11] 4,342,933

[45] Aug. 3, 1982

[54] ELECTRICAL COMMUTATOR

[75] Inventors: Heinz Gerlach, Ehningen; Lothar Woerner, Stuttgart, both of Fed. Rep. of Germany

[73] Assignee: Kautt & Bux KG, Stuttgart, Fed. Rep. of Germany

[21] Appl. No.: 754,682

[22] Filed: Dec. 27, 1976

[30] Foreign Application Priority Data

Jan. 20, 1976 [DE] Fed. Rep. of Germany ....... 2601845

[51] Int. Cl.[3] ............................................. H02K 13/04

[52] U.S. Cl. ..................................... 310/234; 310/219

[58] Field of Search ............... 310/219, 233, 234, 235, 310/236, 237

[56] References Cited

U.S. PATENT DOCUMENTS

| | | | |
|---|---|---|---|
| 2,826,707 | 3/1958 | Camprubi | 310/234 |
| 3,223,869 | 12/1965 | Reisnecker | 310/234 |
| 3,447,011 | 5/1969 | Amrein | 310/236 |
| 3,448,311 | 6/1969 | Mommsen | 310/236 |
| 3,519,863 | 7/1970 | Ambler | 310/234 |
| 3,566,460 | 3/1971 | Yamaguchi | 310/236 |
| 3,590,296 | 6/1971 | Dumez | 310/234 |
| 3,996,660 | 12/1976 | Hancock | 310/235 |

FOREIGN PATENT DOCUMENTS 1269237 1/1969 Fed. Rep. of Germany ...... 310/233

*Primary Examiner*—R. Skudy

*Attorney, Agent, or Firm*—Wigman & Cohen

[57] ABSTRACT

A commutator for electric machines is disclosed. The commutator comprises a cylindrical body of insulating material having a plurality of lamella segments affixed by means of projecting anchoring elements about the periphery thereof. Each lamella segment is provided at one end with a hook base and hook to the latter of which a coil wire is electrically and mechanically connected by welding. The insulating body has radially and axially projecting ribs which support the respective hook bases of the lamella segments. The width of each supporting rib and associated hook base gradually increases from a point adjacent the hook toward the transition from the hook base to the lamella segment to provide better support and heat conductivity during the process of welding the coil wire to the hook. The commutator is constructed by forming an annular lamella jacket from a continuously rolled profiled strip having a plurality of cam-shaped elements and crosspieces the latter of which are separated from the strip by a circular scaling blade to form the coil hooks. A pair of circular counter blades are used to separate the opposite ends of the cam-shaped elements and form the anchoring elements of each lamella segment.

11 Claims, 10 Drawing Figures

Fig.2.
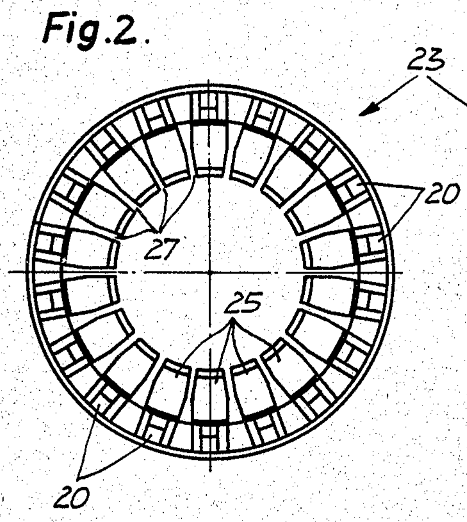
Fig.3.
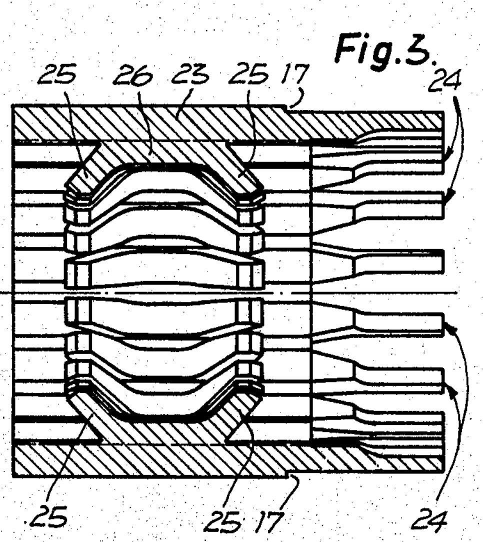
Fig.4
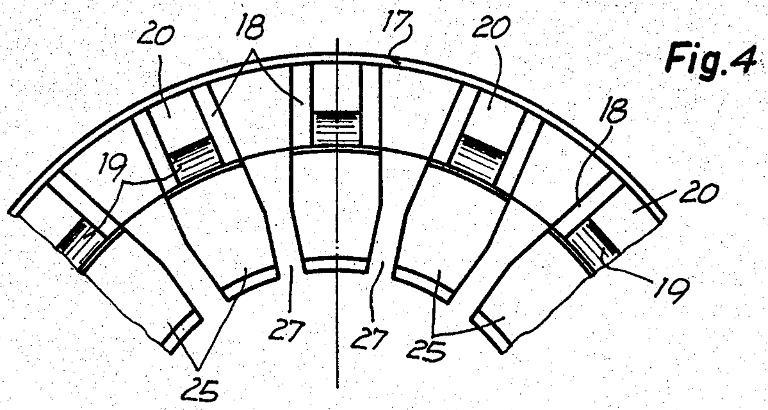
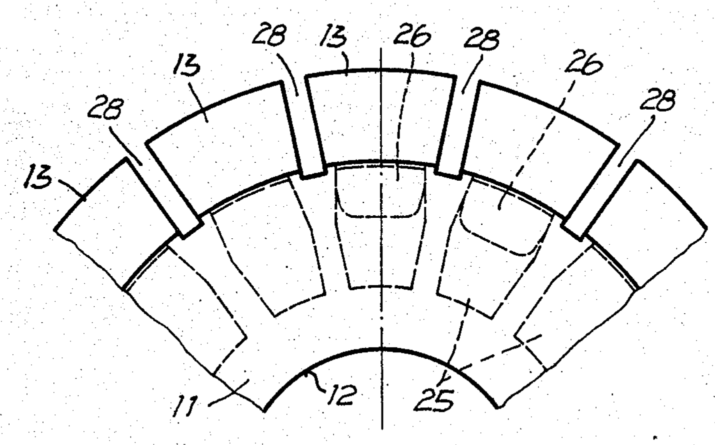
Fig.5

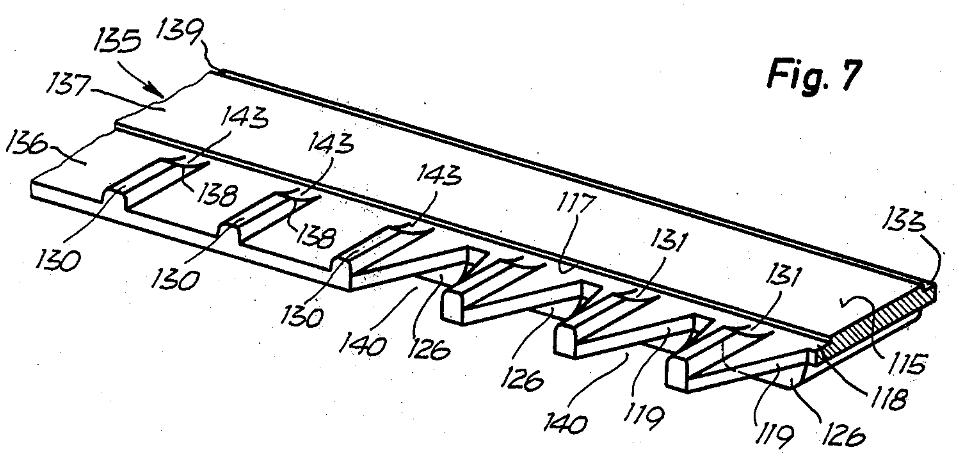
Fig. 7
Fig. 8
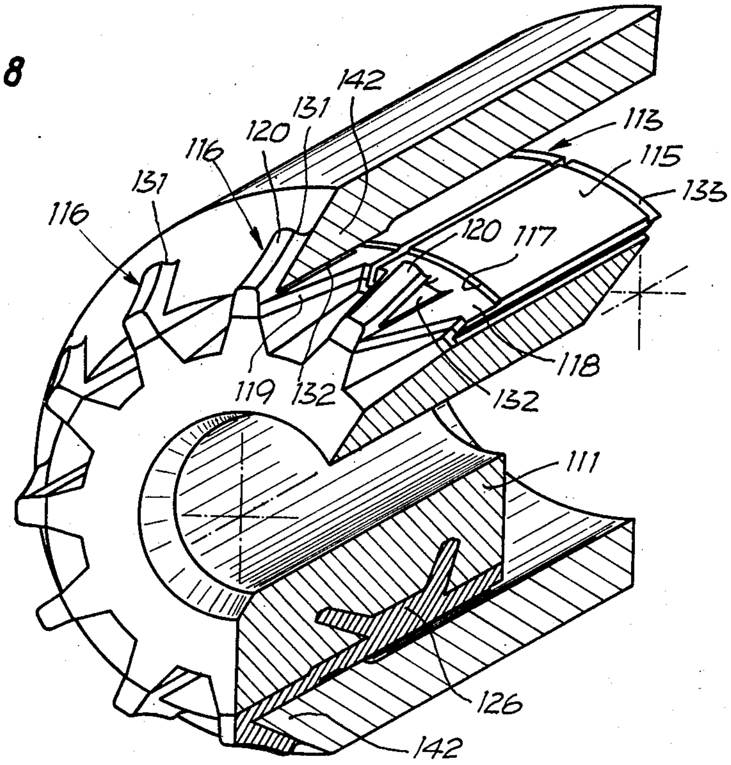

ELECTRICAL COMMUTATOR

BACKGROUND OF THE INVENTION

The present invention relates to a collector for electric machines, having a body made of insulating material and lamellas or commutator segments anchored in the body by shaped anchoring elements. On one end of each lamella there is provided a hook element with a base. The insulating body is provided with a supporting rib for each hook base. The free end portion of each hook is narrower in the peripheral dimension of the insulating body than the portion of its attached lamella forming the bearing surface of the collector.

In such collectors, the coil ends are often electrically and mechanically connected with the attached hooks by welding after they are mechanically snapped into position. By this welding, the electrode of a rheostat welding machine is set up and pressed down on the free end of the hook. Thus, the coil end which is insulated by varnish and attached to the hook is melted by the flow of heat and pressure and is thereby welded to the hook.

Easy accessibility of the hooks is a condition of the continuous mechanical coiling of a runner and for the resulting automatic snapping into position of the coil end at the appropriate time on the attached hooks. For that reason, in known collectors there are tongues provided on the ends of the lamellas which tongues are turned toward the coil. The tongue has the same cross-sectional area over its entire length and is bent to form a coil hook. The portion of this coil hook which forms the hook base is supported by a supporting rib of the insulating body.

However, it has been found that the coil hooks of these collectors cannot withstand the welding pressure which is necessary for satisfactory welding, particularly when a relatively thick varnish coating, or double-coated varnish insulated wire is used, as is more and more frequently the case. In particular, the supporting ribs of the insulating body are melted or otherwise destroyed and as a result the coil hooks may become displaced in a direction toward the bore of the collector. Consequently, the required welding pressure cannot be achieved. In addition, the connection between the lamellas and the insulating body in which only small anchoring elements are generally anchored, becomes loose, and as a result the collector is not usable.

SUMMARY AND OBJECTS OF THE INVENTION

An object of this invention is to provide a collector, which could be used even with a relatively thick and/or double coated varnish insulated wire which may be readily connected with the hooks by welding. In the case of a collector of the above-described type, this object, in accordance with the invention, is achieved by the fact that the width of that portion of each hook forming the base thereof, as measured in the peripheral direction of the insulating body, increases from that part of the hook base adjacent the hook to the section of the base adjacent the lamella.

The transmission of heat from the hook to the lamella is improved by such enlargement of the cross-section of the hook base. As a result, the unavoidable local heating of the hook for a short period of time after completion of the welding process can be dissipated substantially faster when compared with known collector designs. Consequently, the carbonization and breaking down of the supporting rib is avoided. Furthermore, the widening of the section forming the base of the hook from the hook toward the lamella makes possible the enlargement of the superimposed surface of the supporting rib, to thereby reduce the specific heat load and the specific pressure load on this superimposed rib surface. As a result, the loading capacity of the supporting rib is also substantially increased. Finally, the increasing cross section of the hook base results in greater rigidity and, consequently, in the possibility of greater mechanical loading of the hook during the welding process.

In the case of the preferred design, the width of the section which forms the base of each hook increases to almost the width of the lamella in the area adjacent the bearing surface of the lamella. Without taking into consideration the question of accessibility to the hooks, this feature provides the greatest possible increase of the cross-section, with the advantages resulting therefrom. In the same way, with regard to heat conductivity and the provision of a superimposed rib surface which is as large as possible, it is advantageous to have a gradual widening of the section with forms the base of the hook.

Also, in the case of a preferred design, the thickness of the material of the section forming the base of the hook, which thickness is measured in the radial direction of the insulating body, is greater than the radial thickness of the free end of the hook. In this case, it is particularly advantageous to provide a gradual transition from one thickness of the material to the other. In this way, the heat conductivity is further improved as well as the mechanical resistance of the hook to bending. Consequently, there is obtained, in conjunction with the large surface support provided by the supporting rib, an assembly which withstands high mechanical as well as high thermal loads.

If the superimposed surface of each supporting rib which supports the section forming the base of the hook has the same geometric form as that of the surface of the hook base, then the load on the supporting rib reaches a minimum value. This also provides better accessibility to the hook and the possibility of arranging the coil wire on the side of the hook at a very short spacing from the longitudinal axis of the collector.

In the case of another advantageous design, the end of the hook is shaped from a crosspiece which is partly separated from the section forming the hook base. The crosspiece terminates preferably at a distance from the narrow side of the bearing surface of the lamella which confronts the crosspiece. A particular advantage of this design is that it can be made at advantageous costs.

In order to insure that the heat passing from the hook to the lamella will not be detrimental to the connection between the lamella and the insulating body, the width of the anchoring element at the area adjacent the lamella, as measured in the peripheral direction of the collector in the case of a preferred design, is, at most, slightly smaller than the width of the lamella. The side surfaces of the anchoring elements of adjacent lamellas, which surfaces confront each other, are disposed, at least within the area of the free end sections of of the anchoring elements, parallel to and at a close spacing from each other, which spacing, nevertheless, is sufficient for purposes of insulation. This arrangement not only increases the mechanical strength but also the heat absorbing capacity of the anchorage. Furthermore, the forces which are transmitted through the lamella to the insulating body during the welding process are specifically small, and it is no longer possible for this zone to extend as a result of the welding pressure from the anchoring elements to the lamella. In addition, the anchoring elements are separated only by thin, but at the same time, tough insulating layers, by which the lamellas form a solid bond supported on both sides by the anchoring elements. Moreover, such formation of the anchoring elements leads to a very favorable condition of the collector in terms of the speed of rotation, that is, a condition of favorable transmission to the insulating body of the centrifugal forces, which forces could otherwise have a detrimental effect on the lamellas.

Another object of the invention is to provide a method which makes it particularly advantageous from an economic point of view to install collectors designed according to the invention. This task concerns those collectors in which the free end of the hook is formed from a crosspiece which is partly separated from the hook base. According to the invention, the problem is solved by the fact that the crosspieces are made by rolling a strip of material with a toothed roller in one zone of the material, which is connected transversely with another material zone provided for the forming of the lamellas and their associated anchoring elements and also by the fact that the material zone provided with the crosspieces includes recesses, between which the remaining material of the strip forms the hook bases. Thereafter, the crosspieces are split advantageously by means of a scaling blade which fashions or shaves the lamellas longitudinally to form the bearing surfaces thereof. The crosspieces are then shaped to form the free ends of the hooks. The hooks can also be formed in the same operational process as the working of the lamellas to produce the bearing surface, and this is accomplished by the same tools.

The forming of the anchoring elements is also particularly simple, when they are split and shaped by means of two circular cutters which are movable counter to one another. The circular cutters are provided with centrally recessed stamped stars having crosspieces which have parallel surfaces and correspond in their width to the minimum distance between adjoining anchoring elements.

The following description explains in detail the present invention as shown in the embodiments in the drawings wherein:

BRIEF DESCRIPTION OF THE DRAWINGS

FIG. 2 is an end view of the lamella jacket of the first embodiment of the invention;

FIG. 3 is a longitudinal section of the lamella jacket of FIG. 2;

FIG. 4 is an enlarged fragmentary section of FIG. 2;

FIG. 5 is a fragmentary view of the lamella jacket shown in FIG. 4, after the anchoring elements have been embedded in the insulating body;

FIG. 7 shows in perspective a section of a profile strip for the production of collectors according to the second embodiment of the invention;

FIG. 8 shows in perspective and in longitudinal cross-section a scaling cutter and a collector after the scaling of the bearing surface and during the splitting and shaping of the crosspieces to form hooks.

DETAILED DESCRIPTION OF A PREFERRED EMBODIMENT

Figure 1:
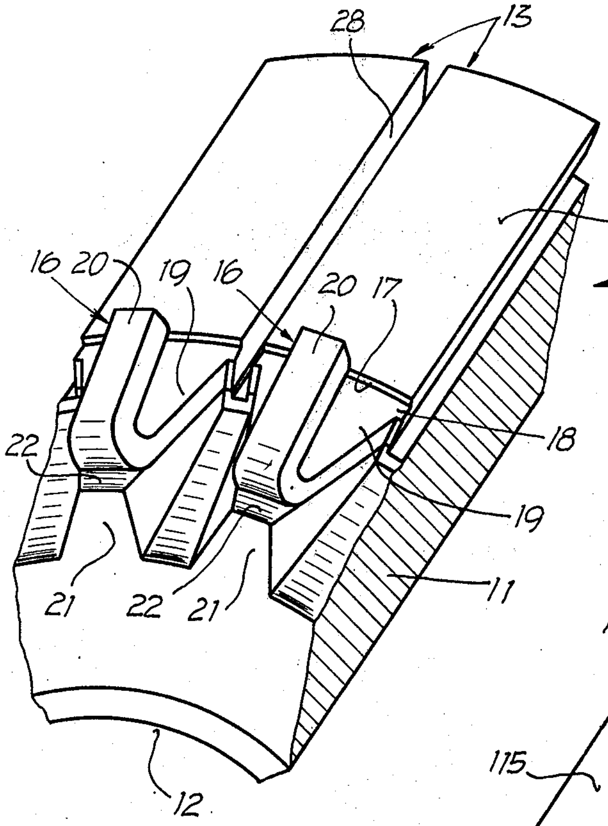
FIG. 1 shows in perspective a fragmentary section of a first embodiment of the invention.

A collector designated generally by reference numeral 10 consists of a body of insulating material 11 having a longitudinal axial borehole 12, which receives an arbor (not shown) of an electric machine and lamellas 13, which are separately arranged side-by-side and are electrically insulated. The lamellas 13 surround the insulating body 11 and are mechanically fastened thereto by means of anchoring elements 25 (FIGS. 2–5) which are embedded in the insulating body 11.

On one end of each of the equi-spaced, identical lamellas 13, in an embodiment of the invention during construction of a segment having a bearing surface 15, there are lamellas 13 shown as integral units with coil hooks 16. The front surface 17 of the lamella is formed by a slightly elevated portion of the lamella. The coil hook 16 is not directly connected in the given embodiment with the part of the lamella 13 which carries the bearing surface 15, but rather is connected to a transition section 18 having a small axial length and the width of which is the same as the width of the part of the lamella which carries the bearing surface 15. From the transition section 18, there extends in the longitudinal direction of the lamella 13 a section of the coil hook 16 which forms the hook base 19. The free end 20 of the hook, which is bent backward or back upon itself, is attached to the hook base 19. The free end 20 of the hook has the same cross section throughout its entire length, and, measured in the peripheral direction of the collector body 11, is substantially narrower in width than the transition section 18. The width of the section which forms the hook base 19 widens gradually from the free end 20 of the hook 16 toward the transition section 18, until it reaches a width which is only slightly smaller than the width of the transition section 18, as shown in FIG. 1. As a result, the surface of the hook base 19, which confronts the free end 20 of the hook 16 and which is used for laying the connected wire, as well as the bottom of opposite surface of the base 19 are trapezoidal.

As shown in FIG. 1, the insulating body 11 extends at the end of the lamellas which support the coil hooks 16, longitudinally beyond the lamellas and tapers into a conical form in this region towards the front surface of the body 11. From the conical surface of the body 11, there protrude, individually in the radial direction, the supporting ribs 21 which are formed from the insulating body and extend longitudinally thereof. Each of these supporting ribs 21 is aligned with a respective one of the coil hooks 16 and is located adjacent the lower or bottom surface of the section which forms the hook base 19. The upper surface of the supporting rib 21, which forms the loading surface 22, has a width corresponding to the width of the supported lower surface of the hook base 19. The supporting ribs 21 widen toward the conical zone of the insulating body 11 which carries them to about the width which they have at the widest place of the section which forms the hook base 19. This insures the supporting ribs 21 have a high carrying capacity, without making it difficult to gain access to the coil hooks 16 and to arrange the wires connected with the hooks.

The collector 10 consists of a laminated jacket 23 which is shown in FIGS. 2 and 3 without the insulating body 11. On the laminated jacket 23, as an extension of each lamella to be formed, there are integrally formed tongues 24. The coil hooks 16 are formed from these tongues, thus, the tongues are separated from each other. As shown in FIG. 3, the section of the lamella which later forms the hook base 19 is stiffer, i.e., thicker, than the section 20 attached to it and from which the free end 20 of the hook 16 is subsequently formed. However, the transition from greater sturdiness to lesser sturdiness is gradual.

As FIG. 3 further shows, at the inner side of the laminated jacket there are attached two anchoring elements 25 for each lamella to be formed and which are separated from one another by an attached cam-shaped member or cog 26. The cross-section of the cogs 26 and of the anchoring elements 25 are shown particularly in FIGS. 4 and 5. The width of the cam-shaped elements 26 and of the anchoring elements 25, measured in the peripheral direction of the lamella jackets 23 in the area of transition to the lamellas, is dimensioned, considering manufacturing tolerances, such that, after the insulating mass has been pressed into the lamella jacket to form the insulating boy 11 and after partition of the lamella jacket into individual lamella segments, the required spacing is insured. Thus, the width of the anchoring elements 25 decrease toward their free ends in such a way that the confronting surfaces of the sides of adjacent anchoring elements are parallel over a substantial part of the length of the anchoring elements 25 to form the slits 27 (FIG. 4). The width of the slits 27 is only so small as to guarantee electric insulation by the insulating material. The lamella separation slit 28 and the corresponding slit 27 are located in the same common plane passing through the longitudinal axis of the collector 10 as best seen in FIG. 5.

Figure 6:
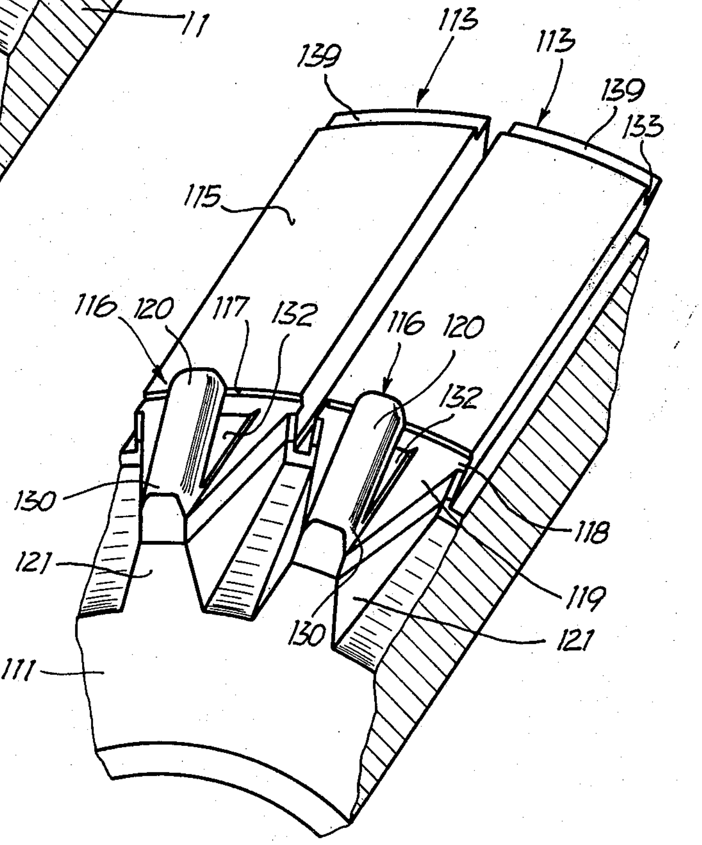
FIG. 6 is a perspective fragmentary view of a second embodiment of the invention.

A second embodiment of the invention is presented in FIGS. 6 and 8 and differs from the first embodiment only by a different construction of the coil hook. Accordingly, the description of the second embodiment is limited to an explanation of the shape and fabrication of the coil hook.

Each of the coil hooks 116, all of which are identically constructed, is connected with a transition section 118, which is shaped in the same way as the transition section 18 of the first embodiment. The section of the coil hook 116 which forms the hook base 119 comprises a trapezoidal tongue or plate, the maximum width of which, as measured in the peripheral direction at the connection with the transition section 118, is slightly smaller than the width of the transition section 118. At the free end of the base 119 which is directed away from the transition section 118, the width of the base is the same as the width of the free end 120 of the hook. In the embodiment shown this latter width is about one-third of the width of the lamella in the portion thereof which forms the bearing surface 115.

The underside of the section which forms the hook base 119 is arranged confronting the top surface of a supporting rib 121 of the insulating body 111. The supporting ribs 121 are constructed in the same way as the supporting ribs 21 of the first embodiment. In particular, the superimposed surface of the rib is adjusted to the shape and size of the underside of the hook base 119, as shown in FIG. 6.

The free end 120 of the hook 116 is formed by a part split from a crosspiece 130, which is formed on the outer surface of the hook base 119 and extends from the free end thereof in the longitudinal direction of the lamella towards a front surface 117 of the lamella segment 113 at the transition region between the bearing surface 115 and the transition section 118, but terminates at an interval from the front surface 117 in a transverse front surface 131 (FIG. 7). The width of the crosspiece 130, as measured in the peripheral direction of the collector, is equal to the width of the smaller end of the hook base 119. Each of the crosspieces 130 is rounded on its upper edges as best seen in FIG. 6. The part of the crosspiece 130 which comprises the free end 120 of the hook 116, forms a sharp angle with the remaining crosspiece part 132, the height of such part 132, as measured in the radial direction of the collector, is equal to the height difference between the bearing surface 115 and the transition section 118. The sharp angle formed between the hook 116 and part 132 opens toward the bearing surface 115.

Each of the lamellas 113 is provided with an end section 139 located at the end of the lamella opposite the hook 116. The end section 139 is constructed essentially in the same way as the transition section 118, that, is, it extends over the entire width of the lamella in the peripheral direction of the collector, and is located below the bearing surface 115 to the same radial extent as the transition section 118, and in the longitudinal direction of the lamella 113 has approximately the same dimension as the transition section 118, and is, therefore, relatively short.

Referring now to FIG. 7, the lamellas 113 are made from a profile strip 135, a portion of which is shown and from which various products are made. The profile strip 135 is made by rolling a suitable, strip-forming intermediary material. The rolling tools which are used, but which are not shown, are shaped in such a way that the profile strip 135 is provided in its lower side with parallel cam-shaped elements 126 formed transversely to the direction of rolling by means of a toothed roller. These elements 126 are arranged at an equal spacing from each other, corresponding to the subsequent partition of the lamella segments of the collector. The width of the cam-shaped elements 126 is selected in such a way that the space between the base of adjacent elements is only so great as required in view of the production tolerances for the subsequent cross-sections of the collector components. The length of the elements 126 in the strip 135 corresponds to the subsequent length of the lamella. It should be noted that the cams 26 in the first embodiment are made in the same way as described here.

The crosspieces 130 on the upper side of the profile strip 135 are aligned longitudinally with the cam elements 126 on the lower side thereof. The crosspieces are formed in a zone 136, which is attached adjacent a zone 137, from which there is subsequently formed the bearing surfaces 115. The zone 136 is located lower than zone 137 by a distance to give the required radial spacing as aforementioned. The crosspieces 130, as shown in FIG. 7, are constructed in such a way that their ends confronting the zone 137 terminate in a radius 138 and adjacent the zone 137 blend into the upper surface of the zone 136. The width of the crosspiece 130, as measured in the longitudinal or rolling direction of the profile strip 135, corresponds to the desired width of the hook 116. A narrow border rim, which subsequently forms the end section 139, is connected with the zone 137 on the side away from the zone 136 and is recessed to the same extent as the zone 136 with regard to the upper side of the zone 137 and is rolled preferably simultaneously with the zone 136.

After the rolling process, the recesses 140 are punched out of the zone 136. Their shape is selected in such a way that only the transition sections 118 and the sections of the free and of the hook bases 119 remain. The width of the section which forms the hook base 119 at the junction with the transition section 118 is substantially equal to the width of the cam-shaped elements 126. The same applies to the width of the section which forms the hook base 19 in the first embodiment.

A jacket of lamellas is formed from the profile strip 135 after the punching of the recesses 140. This jacket is then molded with insulating material to form the insulating body 111, with the central borehole of the collector. Thereafter, the individual lamellas 113 are separated from each other by slitting. These operational processes are known and consequently need not be explained in greater detail.

As shown in FIG. 8, the collector is then provided with the desired diameter by a scaling or shaving process applied in the axial direction of the collector. To accomplish this, a scaling blade 142 having a circular cutting edge is applied against the front surface 133, of the lamellas 113 which surface is formed by the radial surface extending between the zone 137 and the end section 139, and is then displaced in the axial direction in relation to the body of the collector. As the scaling blade 142 is urged axially over the area of the bearing surface 115, the crosspieces 130 are split and the separated part forms the free end 120 of the hook 116. The radial height difference at the transition from the bearing surface 115 to the transition section 118 insures that the shavings removed from the bearing surface 115 by the scaling blade 142 are free, so that they do not interfere with the splitting of the crosspieces 130. The front surface 117 is inclined or oblique, so that the shavings break and leave no burr. An angle of about 60 degrees with the bearing surface 115 has proven to be particularly advantageous in this case.

Figure 9:
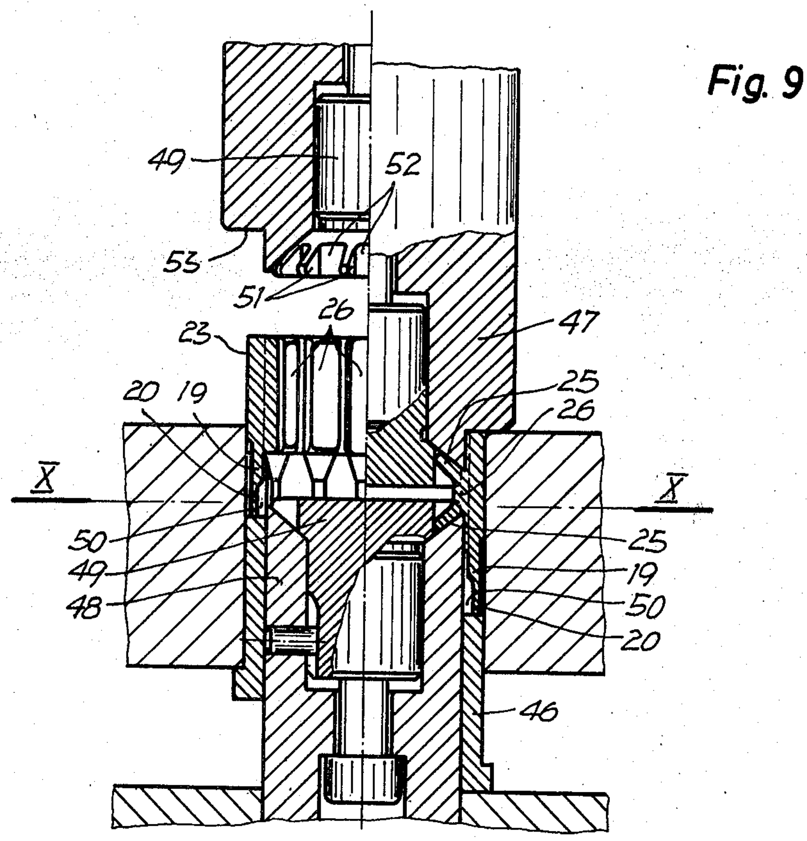
FIGS. 9 and 10 show respectively a longitudinal section and a cross-section along line X—X of FIG. 9 and illustrate a tool for splitting and shaping of anchoring elements of a lamella jacket.
Figure 10:
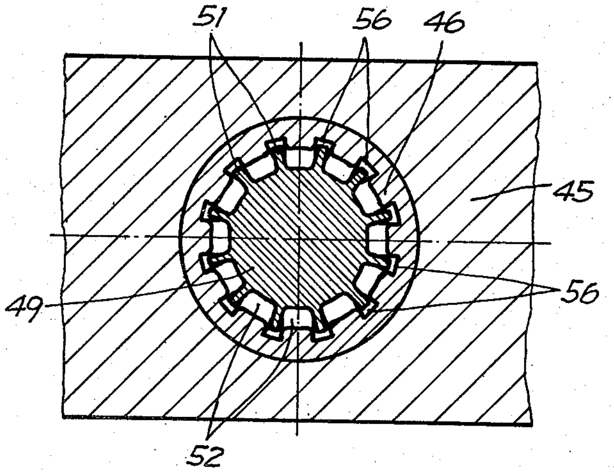

Before the molding of the jacket of the lamellas with the insulating material to make the insulating body, the anchoring elements are formed, in both embodiments of the invention, by splitting them from the end portions of the cam-shaped elements 26 and 126, respectively. A tool designed for that purpose is shown in FIGS. 9 and 10. FIG. 9 is presented such that the tool is shown in the left half thereof in the ascending position and in the right half in the descending position.

The tool has a receptor 45, an ejector 46 and two circular-shaped cutting blades 47 and 48 respectively operating in opposite directions with regard to each other and stamping stars 49 arranged centrally of the blades 47, 48. The ejector 46 is equipped with appropriately shaped recesses 50 and is secured against deformation in the receptor 45. The stamping stars 49, which are equipped with narrow parallel-sided crosspieces or fingers 51, are connected with the cutting blades 47 and 48, respectively, and are arranged in such a way that the recesses 50 of the ejector 46 are aligned with the intermediary spaces 52 formed between the crosspieces 51.

When, for example, a collector is to be constructed in the first embodiment, the jacket of the lamellas 23, as shown in the left half of FIG. 9, is provided with the free ends of the hooks 20, which, at this point in the method, are not formed as yet, and the hook base 19, is set in position in the recesses 50 of the ascending ejector 46. By bringing the upper cutting blade 47 down, the lamella jacket 23 is pushed downwardly by the pressure of the cutting edge 47 on the upper ends of the cam-shaped elements along with the ejector 46 into the receptor 45 until the lower ends of the elements 26 engage the cutting edge of the lower cutting blade 48. While the upper cutting blade 47 continues to descend, the cutting edges of both blades cut into the elements 26 at the opposite ends thereof and form the anchoring elements 25 at an angle which corresponds to the inwardly inclined oblique surface of the blade and are centered. In accordance with the force applied to the cutting blades, these anchoring elements 25 are pressed continuously into the intermediate spaces 52 of the stars 49 which spaces are limited by the crosspieces 51. As a result, the anchoring elements 25 are formed on their side into their side surfaces in such a way that they are spaced apart a distance equal to the narrow, parallel intervals formed by the crosspieces 51 of the stamping stars 49. As shown on the right side of FIG. 9, it will be appreciated that it is of no consequence if the cutting process at the upper and lower sides of the elements 26 takes place at the same time or ocurrs at different times, because, on the one hand, the final position of the lamella jacket 23 is determined by the limitation of the displacement of the ejector 46, and, on the other hand, the upper cutting blade 47 is limited in the final position by a shoulder 53 at the end of the downward displacement of the blade 47.

If a lamella jacket is formed in the above-described tool for the production of a collector according to the second embodiment of the invention, the receptor 45 need only be provided with additional recesses for receiving the crosspieces 130 formed on the hook base 119.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A collector for electrical machines comprising a plurality of lamella segments, each segment having anchoring elements and being connected to a cylindrical insulating body by means of said anchoring elements, each of said lamella segments having at one end thereof a hook base from a free end of which a hook protrudes, said insulating body having a plurality of supporting ribs each of which supports a respective hook base, the width of each hook base, as measured in the peripheral direction of the insulating body, increasing from the free end thereof toward its associated lamella segment.

2. The collector according to claim 1, wherein each of said lamellas is provided with a bearing surface having a peripheral width, the width of the hook bases increasing to substantially the same width as the peripheral width of said bearing surfaces.

3. The collector according to claim 1, wherein the width of said hook bases increases gradually.

4. The collector according to claim 1, wherein the thickness of said hook bases is greater than the thickness of said hooks.

5. The collector according to claim 4, including a transition zone of gradually increasing thickness between each hook base and its associated hook.

6. The collector according to claim 1, wherein each supporting rib includes a peripheral loading surface for supporting a peripheral surface of its respective hook base, the peripheral loading surface of said supporting rib and the peripheral surface of said hook base having substantially corresponding forms.

7. The collector according to claim 1, wherein said hooks comprise portions of crosspieces integrally formed on said hook bases and partly separated therefrom.

8. The collector according to claim 7, wherein said crosspieces include ends which terminate at a spacing from said lamella segments.

9. The collector according to claim 7, wherein each lamella has a bearing surface and is provided at the end thereof opposite the hook with an end portion spaced radially beneath said bearing surface, each hook base having an outer peripheral surface spaced radially beneath said bearing surface at substantially the same distance as said end portion.

10. The collector according to claim 9, including a shoulder surface between said bearing surface and the outer peripheral surface of said hook base, said shoulder surface forming an acute angle with the longitudinal axis of said insulating body.

11. The collector according to claim 1, wherein each of said anchoring elements extends radially inwardly from its associated lamella segment and includes a radially inwardly projecting free end, the peripheral width of said anchoring elements adjoining said lamella segment being slightly less than the peripheral width of said lamella segment, the confronting surfaces of the free ends of adjacent anchoring elements being spaced from and parallel to each other over radial portions thereof.

* * * * *